(12) United States Patent
Lee et al.

(10) Patent No.: US 8,499,879 B2
(45) Date of Patent: Aug. 6, 2013

(54) SYSTEM AND METHOD FOR CLASSIFYING A VEHICLE OCCUPANT

(75) Inventors: Darren (Shih Yuan) Lee, Brighton, MI (US); Russell C. Watts, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 12/856,300

(22) Filed: Aug. 13, 2010

(65) Prior Publication Data

US 2011/0040451 A1 Feb. 17, 2011

Related U.S. Application Data

(60) Provisional application No. 61/234,040, filed on Aug. 14, 2009.

(51) Int. Cl.
*B60K 28/00* (2006.01)

(52) U.S. Cl.
USPC ............ 180/273; 180/271; 701/45; 701/46; 701/48; 701/49

(58) Field of Classification Search
None
See application file for complete search history.

(56) References Cited

U.S. PATENT DOCUMENTS

| | | | |
|---|---|---|---|
| 5,991,676 A * | 11/1999 | Podoloff et al. | 701/45 |
| 6,348,663 B1 | 2/2002 | Schoos et al. | |
| 6,394,490 B2 * | 5/2002 | Osmer et al. | 280/735 |
| 6,422,596 B1 * | 7/2002 | Fendt et al. | 280/735 |
| 6,431,593 B1 * | 8/2002 | Cooper et al. | 280/735 |
| 6,490,936 B1 | 12/2002 | Fortune et al. | |
| 6,609,054 B2 * | 8/2003 | Wallace | 701/45 |
| 6,636,792 B2 * | 10/2003 | Lichtinger et al. | 701/45 |
| 6,849,807 B2 * | 2/2005 | Casey et al. | 177/144 |
| 6,859,753 B1 * | 2/2005 | Thakur et al. | 702/173 |
| 6,916,997 B2 * | 7/2005 | Thakur et al. | 177/136 |
| 6,950,031 B2 * | 9/2005 | Selig et al. | 340/666 |
| 6,950,776 B2 * | 9/2005 | Lich et al. | 702/173 |
| 7,089,775 B2 * | 8/2006 | Mattes et al. | 73/1.08 |

(Continued)

FOREIGN PATENT DOCUMENTS

| | | |
|---|---|---|
| DE | 10246055 | 4/2004 |
| EP | 1525120 | 4/2005 |

OTHER PUBLICATIONS

Landon IP Search Report, pp. 12-13, Oct. 7, 2009.

(Continued)

*Primary Examiner* — Thomas Tarcza
*Assistant Examiner* — Richard Goldman
(74) *Attorney, Agent, or Firm* — Michael Best & Friedrich LLP (57) ABSTRACT

A system for classifying an occupant using a reduced quantity of force sensors. The system includes one or more force sensors, an electronic control unit ("ECU"), and a vehicle safety system. The force sensors are, for example, i-Bolt™ sensors, or other suitable force sensors or force sensing systems. The ECU includes, among other things, an occupant classification module and a safety monitoring module. The occupant classification module receives signals from the force sensors, determines one or more moments about a fixed point of a vehicle occupant control volume, and determines an occupant classification metric based on a mass of the control volume and a center of gravity of the control volume. The occupant classification module uses the occupant classification metric to classify an occupant into one of a plurality of occupant classifications. Based on the occupant classification, the safety monitoring module controls one or more vehicle safety systems.

6 Claims, 7 Drawing Sheets

U.S. PATENT DOCUMENTS

| | | | |
|---|---|---|---|
| 7,140,637 B2 * | 11/2006 | Roelleke et al. | 280/735 |
| 7,333,023 B2 * | 2/2008 | Murad et al. | 340/667 |
| 7,383,113 B2 * | 6/2008 | Marchthaler | 701/45 |
| 7,469,924 B2 * | 12/2008 | Theisen et al. | 280/735 |
| 7,475,903 B2 * | 1/2009 | Watts | 280/735 |
| 7,577,506 B2 | 8/2009 | Fleet | |
| 7,676,339 B2 * | 3/2010 | Fleet | 702/101 |
| 2003/0056997 A1 | 3/2003 | Breed et al. | |
| 2003/0149517 A1 | 8/2003 | Murphy et al. | |
| 2003/0213622 A1 * | 11/2003 | Sakai et al. | 177/208 |
| 2004/0024507 A1 * | 2/2004 | Hein et al. | 701/45 |
| 2006/0267321 A1 * | 11/2006 | Harish et al. | 280/735 |
| 2007/0067082 A1 * | 3/2007 | Watts | 701/45 |
| 2008/0312795 A1 * | 12/2008 | Cho et al. | 701/45 |
| 2012/0012405 A1 * | 1/2012 | Menon et al. | 177/136 |

OTHER PUBLICATIONS

Federal Motor Vehicle Safety Standards and Regulations, U.S. Department of Transportation, National Highway Traffic Safety Administration, Safety Assurance, Office of Vehicle Safety Compliance, available online at: <http://www.nhtsa.gov/cars/rules/import/fmvss/index.html>, Revised Mar. 1999.

International Search Report and Written Opinion for Application No. PCT/US2010/045485, dated Nov. 15, 2010, (12 pages).

* cited by examiner

SYSTEM AND METHOD FOR CLASSIFYING A VEHICLE OCCUPANT

RELATED APPLICATIONS

This application claims the benefit of previously-filed, co-pending U.S. Provisional Patent Application No. 61/234,040, filed Aug. 14, 2009, the entire contents of which are hereby incorporated by reference.

BACKGROUND

The present invention relates to systems and methods for classifying a vehicle occupant.

Modern vehicles include sensors for sensing a variety of conditions of a vehicle. For example, wheel speed sensors, yaw rate sensors, steering angle sensors, and the like are used by electronic stability control ("ESC") systems to improve vehicle stability. Vehicles also include sensors for improving the safety of a vehicle. For example, front and rear impact sensors and force sensors are used to classify vehicle occupants and control the deployment of airbags and other occupant restraints.

Current occupant classification systems include, for example, four force sensors. Each sensor provides an output which is summed to generate what is referred to as a reaction force on the seat. The reaction force is used to determine the mass of a control volume (i.e., the seat above the sensors and any objects located on the seat). Using a known mass of the seat and the reaction force, the occupant weight is calculated. The vehicle occupant is then classified based on the calculated weight.

SUMMARY

Although embodiments of the invention are described below with respect to a vehicle such as a passenger car, in other embodiments, the invention is installed in other vehicles, such as, aircraft, trains, trucks, buses, boats, all-terrain vehicles, snowmobiles, and the like. Additionally, although a vehicle occupant classification system is described below primarily with respect to the passenger seat of the vehicle, the vehicle occupant classification system may be included in other seats and seat types within the vehicle (e.g., a driver's seat, one or more back seats, a bench seat, a bucket seat, etc.) to classify a vehicle occupant in each seat.

In one embodiment, the invention provides a system for classifying an occupant using a reduced quantity of force sensors. The system includes one or more force sensors (e.g., two force sensors), an electronic control unit ("ECU"), and a vehicle safety system. The force sensors are, for example, i-Bolt™ sensors, or other suitable force sensors or force sensing systems. The ECU includes, among other things, an occupant classification module and a safety monitoring module. The occupant classification module receives signals from the force sensors, determines one or more moments about a fixed point of a vehicle occupant control volume, and determines an occupant classification metric associated with a mass of the control volume and a center of gravity of the control volume. The occupant classification module uses the occupant classification metric to classify an occupant into one of a plurality of occupant classifications. Based on the occupant classification, the safety monitoring module controls one or more vehicle safety systems (e.g., an airbag deployment system, a seatbelt pre-tensioning system, or the like). For example, when the occupant classification module classifies the vehicle occupant as a one-year-old child, the airbag deployment system disables one or more airbags associated with the child's seat.

In another embodiment, the invention provides a system for vehicle occupant classification and safety. The system includes at least one force sensor and a controller. The controller includes an occupant classification module configured to receive an output signal from the at least one force sensor, determine a change in the output signal from the at least one force sensor, and generate an occupant classification metric. The occupant classification metric is based on the change in the output signal from the at least one force sensor and at least one auxiliary datum. The occupant classification metric corresponds to a product of a mass and a location of a center of gravity of a control volume. The occupant classification module is also configured to classify a vehicle occupant based on the occupant classification metric.

In another embodiment, the invention provides a method of classifying a vehicle occupant and controlling a system based on the classification. The method includes receiving an output signal from at least one force sensor, determining a change in the output signal from the at least one force sensor, and generating an occupant classification metric. The occupant classification metric is based on the change in the output signal from the at least one force sensor and at least one auxiliary datum. The occupant classification metric corresponds to a product of a mass and a location of a center of gravity of a volume. The method also includes classifying the vehicle occupant based on the occupant classification metric.

In another embodiment, the invention provides a vehicle occupant classification system. The system includes at least one force sensor, an auxiliary sensor, and a controller. The controller includes an occupant classification module that is configured to receive output signals from the at least one force sensor and the auxiliary sensor, and generate an occupant classification metric. The occupant classification metric is based on the output signals from the at least one force sensor and the auxiliary sensor. The occupant classification module is also configured to classify a vehicle occupant based on the occupant classification metric. The occupant classification metric is associated with a product of a mass and a height of a center of gravity of a volume.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to systems and methods for classifying one or more types of occupants within a vehicle, and controlling the operation of at least one vehicle safety system (e.g., an airbag deployment system, a seatbelt pre-tensioning system, or the like) in response to the classification of the occupants. The system includes one or more force sensors (e.g., two force sensors), an electronic control unit ("ECU"), and a vehicle safety system. In one embodiment of the invention, the force sensors are i-Bolt™ sensors. In other embodiments of the invention, other suitable force sensors or force sensing systems are used. The ECU includes, among other things, an occupant classification module and a safety monitoring module. The occupant classification module receives signals from the force sensors, calculates one or more moments about a fixed point of a vehicle occupant control volume, and calculates an occupant classification metric associated with a mass of the control volume and a center of gravity of the control volume. The occupant classification module uses the occupant classification metric to classify an occupant into one of a plurality of occupant classifications. Based on the occupant classification, the safety monitoring module generates one or more control signals to compensate, enable, disable, or otherwise modify at least one vehicle safety system. For example, when the occupant classification module classifies the vehicle occupant as a one-year-old child, the airbag deployment system disables one or more airbags associated with child's seat.

Figure 1:
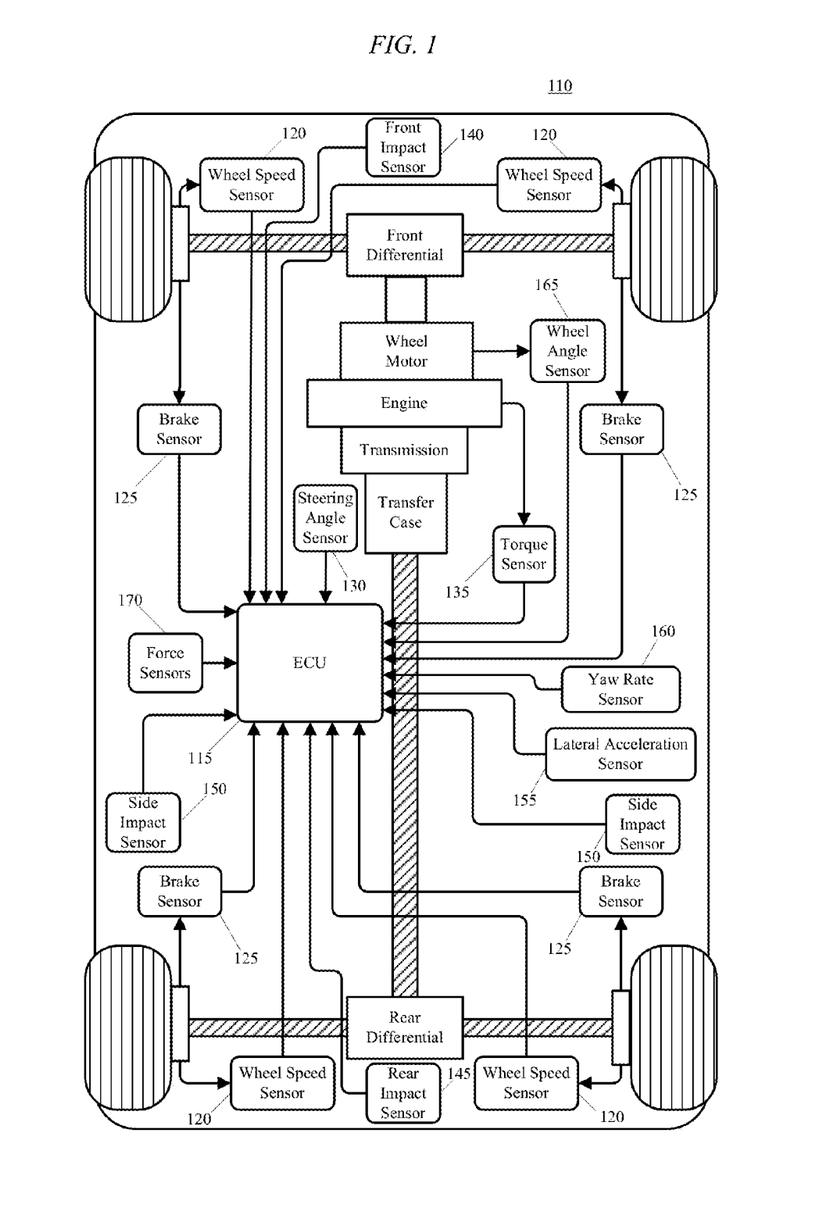
FIG. 1 illustrates a vehicle that includes a vehicle control system having a plurality of sensors.

FIG. 1 illustrates a vehicle 110 that includes a plurality of sensors. The sensors are connected to, for example, an ECU 115 which uses the sensor signals to determine a plurality of conditions of the vehicle 110. The sensors include wheel speed sensors 120, brake sensors 125, a steering angle sensor ("SAS") 130, a torque sensor 135, a front impact sensor 140, a rear impact sensor 145, side impact sensors 150, a lateral acceleration sensor 155, a yaw rate sensor 160, a wheel angle sensor 165, and force sensors 170. The seat sensors include, for example, occupant force sensors such as i-Bolt™ sensors (manufactured by Robert Bosch GmbH), strain gauges, or the like. Data from each of the vehicle sensors is used by one or more vehicle control systems or subsystems, such as an electronic stability control ("ESC") system, a vehicle safety system, or a traction control system.

Figure 2:
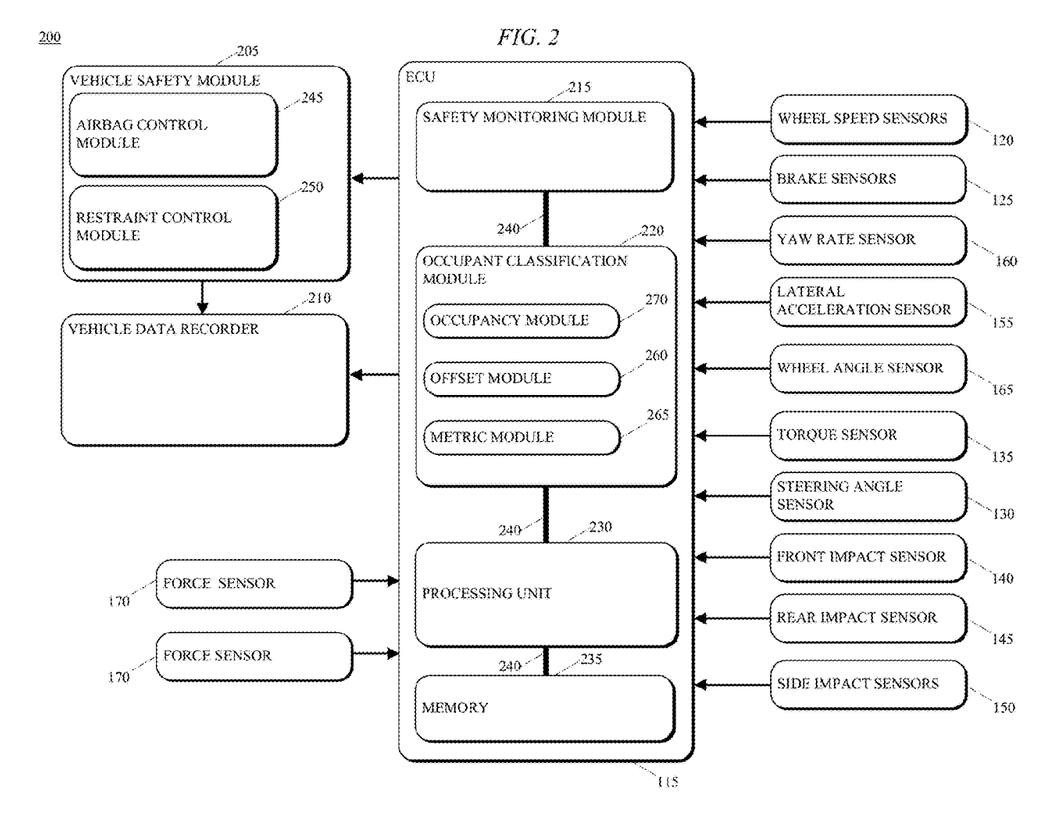
FIG. 2 is a diagram of a vehicle control system according to an embodiment of the invention.

FIG. 2 is a diagram of a vehicle control system 200 that includes the ECU 115, a vehicle safety module 205, and a vehicle data recorder 210. The ECU 115 includes, among other things, a safety monitoring module 215, an occupant classification module 220, a processing unit 230, a memory 235, and a bus 240. The bus 240 connects various components of the ECU 115 including the memory 235 to the processing unit 230. The memory 235 includes, for example, read only memory ("ROM"), random access memory ("RAM"), and/or electrically erasable programmable read only memory ("EEPROM"), or other suitable memory types. The ECU 115 also includes an input/output system that includes routines for transferring information between components within the ECU 115 and the various sensors and modules connected to the ECU 115. Software included in the ECU 115 is stored in a memory such as the EEPROM or ROM, and includes, for example, firmware applications and other executable instructions. The ECU 115 receives signals from the vehicle sensors over, for example, a controller-area network ("CAN") bus. The ECU 115 conditions and processes the signals, and transmits the processed and conditioned signals to the vehicle safety module 205, the vehicle data recorder 210, or other vehicle control systems over the CAN bus. The vehicle safety module 205 receives the processed and conditioned signals, and controls its operation accordingly. In other embodiments, the ECU 115 includes additional, fewer, or different components, or is connected to additional vehicle subsystems, such as a traction control system or an ESC system.

The safety monitoring module 215 receives signals from the occupant classification module 220 and vehicle sensors such as the impact sensors 140, 145, and 150, the wheel speed sensors 120, the yaw rate sensor 160, and the lateral acceleration sensor 155. The safety monitoring module 215 uses these and other sensors to generate one or more control signals to control, among other things, the activation/deactivation of airbags and/or seatbelt pre-tensioning. The safety monitoring module 215 sends control signals to the vehicle safety module 205 which interprets the control signals and applies them to, for example, an airbag control module 245 and/or a restraint control module 250 as necessary.

Signals produced by the force sensors 170 are indicative of forces exerted on the seat. The forces exerted on the seat include, for example, forces due to an occupant or other objects located on the seat, vehicle dynamics, intrinsic loads, and other forces. Vehicle dynamics depend on a travel surface, vehicle speed, vehicle acceleration, and the physical characteristics of the vehicle (such as tire inflation, tilt, and suspension). Intrinsic loads are generally a result of tolerance deviations in the sensors, and represent energy stored in the structure of the seat. The other forces are due to gravity, such as the self-mass of the seat located above the sensors. Additionally, the force exerted on the seat includes intrinsic forces (those not due to the occupant), such as those caused by seatbelts under tension and objects wedged in the seat, and other objects or occupants leaning on the seat.

The signals from the force sensors 170 are sent to the occupant classification module 220 in the ECU 115 which includes, for example, an offset module 260, a classification metric module 265, and an occupancy module 270. The occupant classification module 220 and the force sensors 170 are collectively referred to as an occupant classification system. In one embodiment, the occupancy module 270, classification metric module 265, and the offset module 260 work together to classify a vehicle occupant. Using the signals received from the force sensors 170, the occupancy module 270 determines whether the seat is empty. If the seat is empty, the occupancy module 270 communicates a signal to the offset module 260 instructing the offset module 260 to determine an offset of the signals from the force sensors 170. The offset corresponds to, for example, the intrinsic loads, the intrinsic forces, and the forces due to gravity which act on the seat when the seat is not occupied. The offset module 260 determines the offset using the signals from the force sensors 170, and communicates the offset to the classification metric module 265. If the seat is not empty, the occupancy module 270 instructs the classification metric module 265 to determine an occupant classification metric based on one or more moments about a fixed point or a fixed axis of the seat, as described in greater detail below. In some embodiments, the occupant classification metric is compensated using the offset from the offset module 260. In other embodiments, the occupancy module 270 determines that the occupancy of the seat is unknown and instructs the classification metric module 265 to determine the occupant classification metric without correcting for offset errors. The occupant classification module 220 then generates an occupant classification signal based on the occupant classification metric. The occupant classification signal is sent to the safety monitoring module over the bus 240.

The safety monitoring module 215 generates one or more control signals for controlling the vehicle safety module 205. For example, if the occupant classification module 220 classifies an occupant as a child (e.g., a six-year-old child), the safety monitoring module 215 produces a control signal that instructs the airbag control module 245 to deploy the airbag with a lower deployment force than would be used if the occupant were classified as an adult. Alternatively, if the occupant classification module 220 classifies an occupant as an infant, the safety monitoring module 215 produces a control signal that instructs the airbag control module 245 to disable the airbag to prevent it from being deployed.

As shown in FIG. 2, the force sensors 170 are connected directly to the ECU 115 and the occupant classification module 220 is included in the ECU 115. In another embodiment, the force sensors 170 are connected to a separate control unit that includes the occupant classification module 220. The separate control unit is then connected to the ECU 115.

The force sensors 170 are generally located under one or more of the seats in the vehicle 110. A type of sensor known as an intelligent bolt or i-Bolt™ sensor (manufactured by Robert Bosch GmbH) is used in the embodiments of the invention described herein. However, other force or force sensor systems, such as a strain gauge system, an occupant classification ("OC") sensor mat, a capacitive force measurement system, a passenger occupant detection ("POD") system, or a belt tension sensor ("BTS") are used in other embodiments of the invention.

Figure 3:
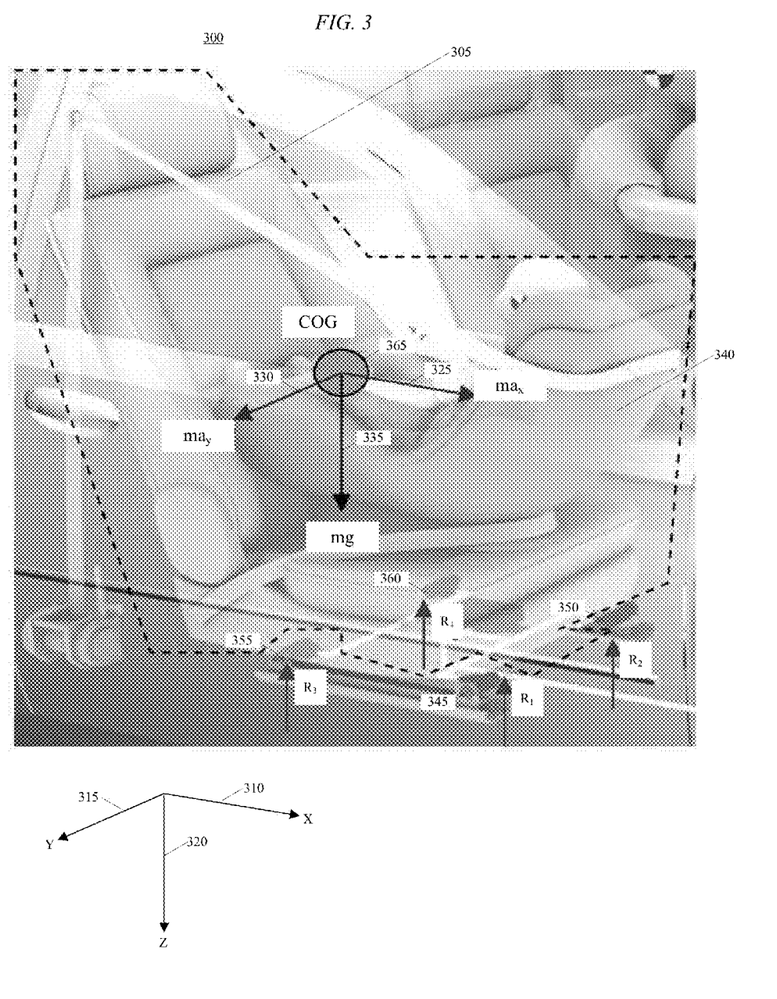
FIG. 3 is a force diagram for a vehicle seat.

FIG. 3 is a force diagram 300 for a vehicle seat 305. The forces associated with the vehicle seat 305 are described with respect to an x-axis 310, a y-axis 315, and a z-axis 320. The axes are used to identify, for example, accelerations acting on the vehicle seat 305 in an x-direction 325, a y-direction 330, and a z-direction 335, respectively. The illustrated vehicle seat 305 includes an infant car seat 340 carrying an infant. The seat 305 and an occupant or object in the seat 305 cause reaction forces $R_1$, $R_2$, $R_3$, and $R_4$ in the z-direction at junction points 345, 350, 355, and 360, respectively, where the seat 305 is connected to the vehicle. An occupant classification system is coupled to the seat 305 for classifying an occupant. In other embodiments, the occupant classification system is installed in other vehicle seats or in another part of the vehicle.

In contrast to vehicle occupant classification systems which use, for example, four force sensors to calculate an occupant weight, a reduction in the number of sensors needed to classify a vehicle occupant is achieved by using a relationship between a mass of a control volume and a center of gravity ("COG") 365 of the control volume. The control volume is, in many instances, considered to be the entire vehicle seat above the force sensors 170 including the space occupied by any objects or persons in the seats. In some embodiments of the invention, the control volume is defined differently, such as only the space occupied by the objects or persons in the seats, or the area including the seat and up to the COG of the objects or persons in the seats. As such, in some embodiments, the control volume is dynamically changing based on conditions of the seat.

Figure 4:
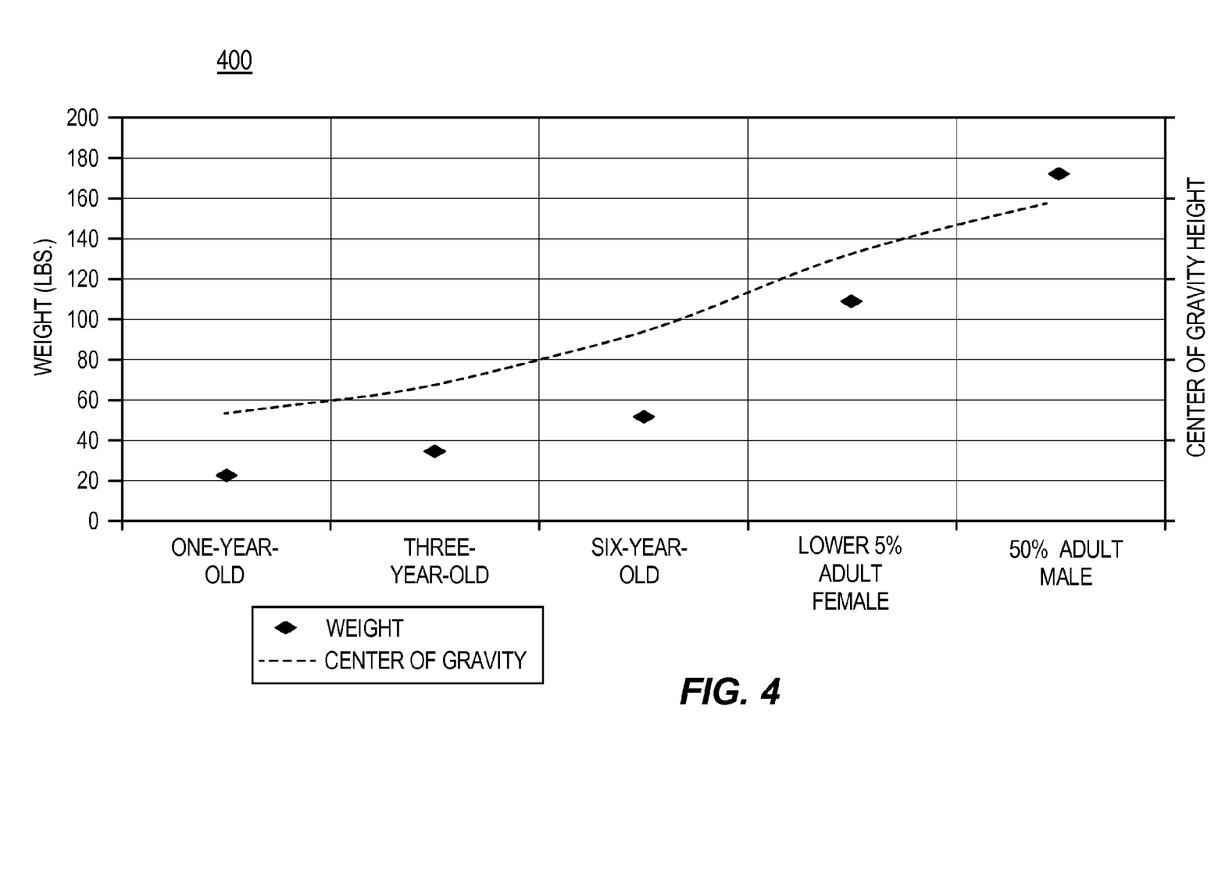
FIG. 4 is a diagram of a relationship between vehicle occupant weight and a center of gravity height of a control volume.

As the diagram 400 in FIG. 4 illustrates, there is a relationship between the weight of a vehicle occupant and the height of the center of gravity of the control volume. The diagram 400 illustrates an average weight of a vehicle occupant in each of five occupant classes. The occupant classes include a one-year old child class, a three-year-old child class, a six-year-old child class, an adult female in the lower-fifth weight percentile class, and an adult male in the fiftieth weight percentile class. FIG. 4 is illustrative and the occupant classification system includes additional or different occupant classifications in other embodiments. As the weight of the occupant increases, the location of the center of gravity increases in a similar manner. Such a relationship allows for the classification of vehicle occupants based on a new occupant classification metric, a product of the mass of the control volume or the mass of an occupant (depending on sensor compensation) and a height of the COG of the control volume. The product of the mass of the control volume and a height of the COG of the control volume is determined indirectly using other sensor values, such as changes in the output values of force sensors and accelerations, or other auxiliary data or signals.

Auxiliary data or signals are data or signals received from or based on sensors such as the wheel speed sensors 120, the brake sensors 125, the SAS 130, the torque sensor 135, the front impact sensor 140, the rear impact sensor 145, the side impact sensors 150, the lateral acceleration sensor 155, the yaw rate sensor 160, the wheel angle sensor 165, a lateral seat acceleration sensor, a longitudinal seat acceleration sensor, a vertical seat acceleration sensor, a lateral seat speed sensor, a longitudinal seat speed sensor, a vertical seat speed sensor, a seat belt buckle sensor, a seatbelt tension sensor, a door sensor, or the like that are used in the calculation of the occupant classification metric. Normally, four force sensors are used. Using the auxiliary data or signals permits the calculation of the occupant classification metric using, for example, two force sensors.

Therefore, by using this occupant classification metric for classifying vehicle occupants, it is not necessary to directly calculate the height of the COG of the control volume or the mass of the occupant (although each can be calculated if desired). Instead, the product of the height of the COG and the mass of the control volume is derived based on a summation of moments about a stationary portion of the control volume. For example, a support point, a support axis, or a support plane is a portion of the control volume (e.g., a portion of the vehicle seat) that is fixed to the vehicle's floor. A change in a velocity or an acceleration, such as a change in an acceleration in the x-direction, $\Delta a_x$, and the moments which are correspondingly generated about the support portion, are used to generate the occupant classification metric. A summation of the moments about the support portion has a value equal to zero because the vehicle seat is stationary. As a consequence of summing the moments about the support portion of the seat, the number of force sensors required to classify an occupant is reduced. For example, the number of force sensors is reduced from four sensors to three sensors, four sensors to two sensors, or four sensors to one sensor, depending on the embodiment of the invention.

As previously described, the offset module 260 is used to calculate an offset value for the seat when the seat is not occupied. The offset value corresponds to vehicle dynamics, intrinsic loads, and intrinsic forces, as described above. In some embodiments, the offset value is used for compensating signals from the force sensors 170 or the occupant classification metric. In other embodiments, the offsets in the outputs of the force sensors 170 are not compensated by the offset value. Instead, the values and ranges associated with each occupant classification are increased to account, at least in part, for the vehicle's dynamics, intrinsic loads, and intrinsic forces. As such, the occupant classification metric is a product of the height of the center of gravity, $COG_Z$, of the control volume and the mass of the control volume (sometimes referred to as CGZM), not the mass of the occupant.

Figure 5:
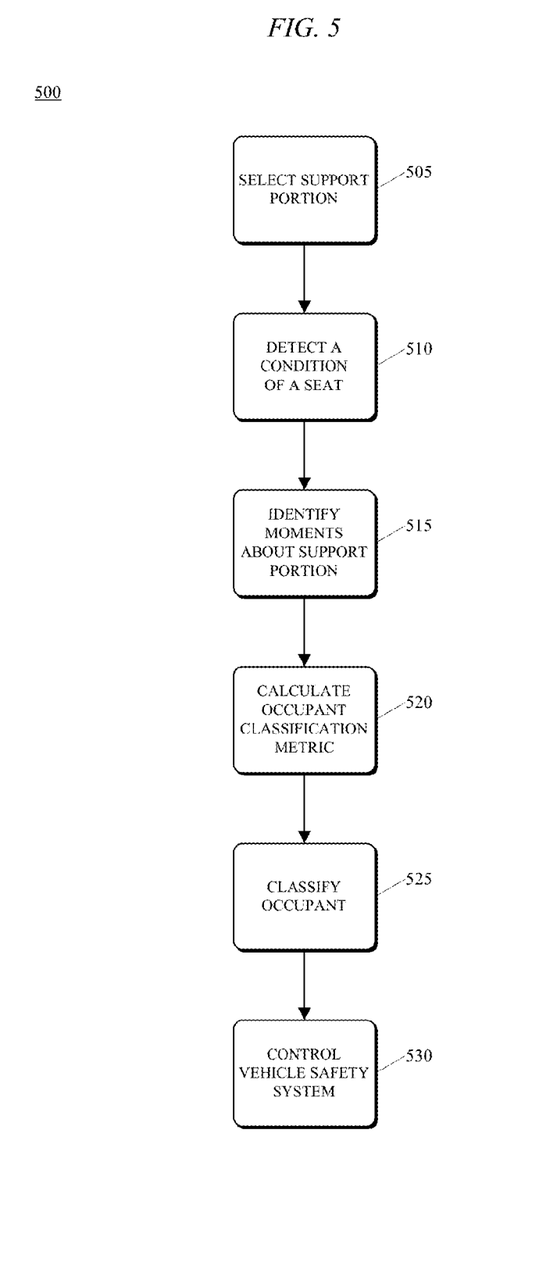
FIG. 5 illustrates a process for implementing an occupant classification metric.

A process 500 for implementing the occupant classification metric is illustrated in FIG. 5. When a vehicle seat is installed or replaced, it is necessary to secure the seat to the vehicle. The seat is secured using a plurality of bolts (e.g., four bolts). According to one embodiment of the invention, two of the bolts are traditional fastening bolts, and two of the bolts are force sensing bolts. The positions of the two fastening bolts are selected to define the support axis or the support portion (step 505), which is then used as a reference for calculating moments of the seat. A condition of the seat is then detected (step 510). For example, one or more acceleration sensors located in the vehicle or, in some embodiments, in the vehicle seat, are used to determine a change in acceleration of the vehicle. Other auxiliary data can also be used individually or in combination with the acceleration sensors to determine the condition of the seat or occupant.

Depending on the position of the selected support portion of the seat, a change in the acceleration along the x-axis or along the y-axis is used by the occupant classification system. Based on the change in acceleration, a plurality of values is identified related to the moments about the support portion (step 515). For example, the forces acting on the seat in response to the change in acceleration and the respective distances of those forces from the support portion are determined. Using these values, the occupant classification metric is calculated (step 520). The occupant classification metric is compared to predetermined values or ranges of values which correspond to different occupant classifications. The occupant is classified (step 525) according to the value or range of values which most closely correspond to the occupant classification metric. The occupant classification system then generates a signal which is sent to the vehicle safety module 205. The vehicle safety module 205 is controlled (e.g., airbags enabled or disabled) based on the classification of the occupant (step 530).

Figure 6:
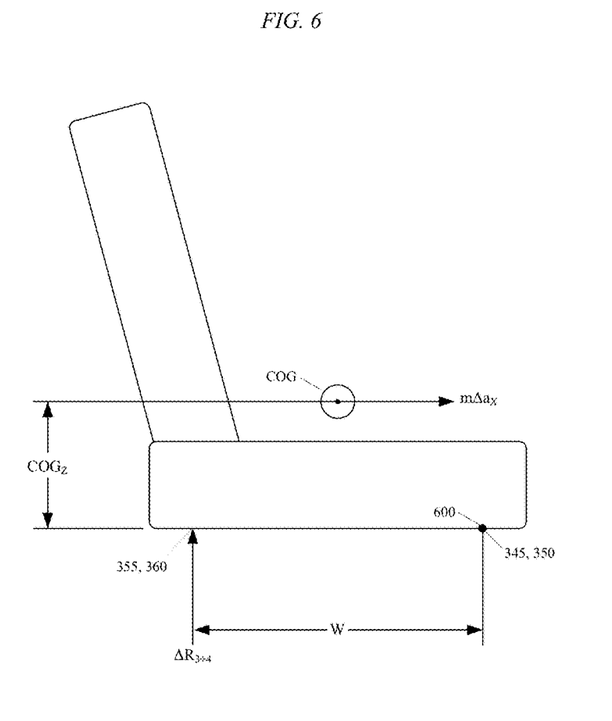
FIG. 6 is a diagram of a side view of a vehicle seat according to an embodiment of the invention.

FIG. 6 provides an illustrative example of the invention. A support portion 600 is selected as an axis in the Y-direction (see FIG. 3) which includes the first seat junction 345 and the second seat junction 350. The sum of the moments, M, which are generated about the support portion 600 with respect to a change in, for example, the acceleration in the x-direction, $\Delta a_x$, is equal to zero, as shown by EQN. 1.

$$\Sigma M_{@R_{1,2}} = 0 \qquad \text{EQN. 1}$$

The change in the acceleration in the x-direction, $\Delta a_x$, results in two moments about the support portion 600. The first moment is a result of the distance or width, W, between the support portion and third and fourth seat junctions 355 and 360, and the change in the reaction forces of the force sensors 170 at the third and fourth junctions, $\Delta R_{3+4}$. The second moment results from the product of the mass, m, of the control volume and the change in the acceleration in the x-direction, $\Delta a_x$, and the height of the center of gravity of the control volume, $COG_Z$, above the support portion. The height of the center of gravity, $COG_Z$, is measured from the z-plane formed by the x-axis 310 and the y-axis 315. As noted above, the summation of the first and second moments has a value equal to zero, as shown below in EQN. 2.

$$\Delta R_{3+4} * W + m \Delta a_x * COG_Z = 0 \qquad \text{EQN. 2}$$

Using EQN. 2, the product of the height of the center of gravity, $COG_Z$, and the mass of the control volume is determined as shown below in EQN. 3.

$$m * COG_Z = \frac{-\Delta R_{3+4} * W}{\Delta a_X} \qquad \text{EQN. 3}$$

The product of the height of the center of gravity, $COG_Z$, and the mass, m, of the control volume is the occupant classification metric (i.e., CGZM). In embodiments of the invention that include, for example, a single force sensor, the change in the reaction forces or output of the single force sensor is used in combination with auxiliary data to generate the occupant classification metric. To generate the occupant classification metric using a single force sensor, additional or different auxiliary data than that described above with respect to FIG. 6 is used (e.g., a belt tension sensor, etc.). In some embodiments, a second force sensor is assumed to have the same output or changes in output as the single force sensor. As such, the occupant classification metric can be calculated using EQN. 3 above with a single sensor. Such embodiments may be less accurate than two sensor embodiments, but the same or similar occupant classifications are achieved.

The occupant classification system includes a plurality of pre-programmed or pre-loaded occupant classifications corresponding to different values of the occupant classification metric. The occupant classification information associated with the occupant classification metric, and used in various embodiments of the invention, is collected, for example, through the testing of moments about various support portions under different vehicle and/or seat conditions. In one embodiment, the test information is collected in a controlled manner using a vehicle car seat and test subjects of varying classifications. Using the reduced force sensor system and method described above, information regarding the test subjects is gathered for a plurality of test conditions, including accelerations in multiple directions (e.g., the x-direction and the y-direction) and velocities in multiple directions (e.g., a summation or integral of velocities can be used in place of a measured acceleration). The test subjects vary in weight and the vehicle seat is configured in a variety of positions. In other embodiments, alternative test information concerning occupant classification is collected and stored (e.g., different sensor configurations, different seat configurations, and different test subjects). Although the invention is described above with respect to an embodiment that includes two force sensors, some embodiments of the invention use a single force sensor, and a summation of the moments about a support point is used to generate the occupant classification metric and classify an occupant.

The occupant classification metric is used to generate an occupant classification signal corresponding to an occupant classification. The occupant classification signal is sent to the safety monitoring module 215 and the vehicle safety module 205 to control the operation of, for example, an airbag deployment system (e.g., to control the airbag deployment timing or airbag deployment force) or a restraint control module which controls, for example, seat belt pre-tensioning.

Figure 7A:
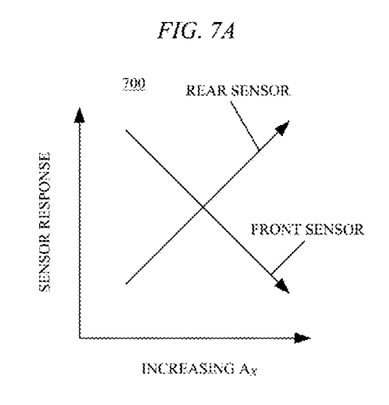
FIGS. 7A and 7B are diagrams of sensor responses for a force sensor in a front portion of a seat and a force sensor in a rear portion of the seat as vehicle acceleration in a forward direction increases.

Classifying occupants in the manner described above allows the ECU 115 to perform a variety of additional functions which are unable to be performed using conventional vehicle occupant classification techniques. For example, FIG. 7A illustrates a first diagram 700 of responses for two sensors coupled to a vehicle seat. One of the sensors is located in a front portion of the vehicle seat, and the second sensor is located in a rear portion of the vehicle seat. As the acceleration of the vehicle increases in a forward direction, the occupant's weight shifts from the front of the seat to the rear of the seat. In an occupant classification system that uses a sum of, for example, four force sensors to classify an occupant, the sum of the sensors does not change. Instead, for two properly functioning force sensors, the output of the front sensor will decrease as the output of the rear sensor increases, as shown in the diagram 700.

Figure 7B:
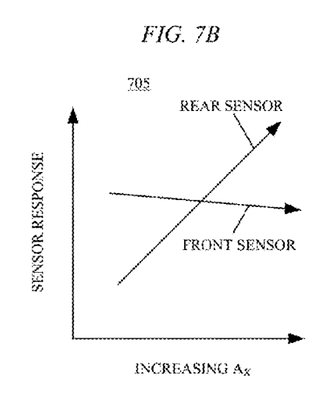

Alternatively, if one of the front or rear sensors is faulty, the conventional occupant classification system may mis-classify the occupant. As shown in diagram 705 of FIG. 7B, the output of the front sensor decreases significantly slower than the output of the rear sensor increases. Such a discrepancy between the changes in the forces alters the sum of the force sensors and causes the conventional occupant classification system to incorrectly classify the vehicle occupant. Such an error is avoided using the occupant classification metric described above. For example, the occupant classification system is able to determine if one of the force sensors is faulty by calculating a first occupant classification metric with the support portion at the front sensor. The occupant classification system then calculates a second occupant classification metric with the support portion at the rear sensor. Because the moments of the seat are based on changes in, for example, acceleration, and not the magnitude of the output of the force sensors, when the first and second occupant classification metrics are compared, the classifications are the same (e.g., the metrics may have opposite signs but result in the occupant being classified into the same occupant classification). If the metrics are not the same, the occupant classification system uses, for example, previously calculated occupant classification metrics to determine which of the force sensors is faulty.

Figure 8:
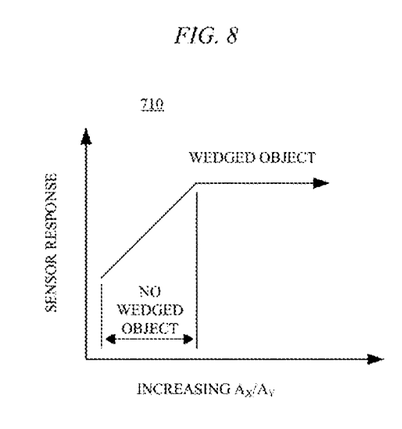
FIG. 8 is a diagram of sensor responses for a force sensor in a front portion of a seat and a force sensor in a back portion of the seat as vehicle acceleration in a forward direction increases.

Additionally or alternatively, the occupant classification metric described above avoids potential errors associated with load-shunted force sensors. For example, if an object is wedged between the vehicle seat and the floor or against the force sensor, the output of the force sensor is prevented from increasing as shown in diagram 710 of FIG. 8. As the acceleration in an x- or y-direction increases, the output of the force sensors increases when there are no wedged objects present. If, however, a wedged object is present, the output of the force sensor is prevented from increasing as the acceleration continues to increase. Because the force sensor output does not change, the occupant may be misclassified by the conventional occupant classification system. The occupant classification metric, which relies, in part, on the change in the acceleration of the vehicle, is able to detect the load-shunted condition because a shunted response of the force sensor does not change correspondingly with the change in acceleration.

An additional application of the occupant classification metric enhances the safety of the vehicle safety module 205. Although the occupant classification technique described above is capable of reducing the number of sensors needed, using such a technique in a vehicle occupant classification system having four force sensors per seat, enables the occupant classification system to determine the actual acceleration of an object in the seat. In such an instance, the occupant classification metric is not based on the acceleration of the vehicle, but rather on the acceleration of the object in the seat. Accordingly, the timing of, for example, airbag deployment or the seatbelt pre-tensioning force is modified to provide optimum protection to a vehicle occupant based on the occupant's actual acceleration in the seat. Determining the occupant's actual acceleration is accomplished by generating a series of equations using multiple support portions as references. The series of equations include, for example, two or more unknown values, such as the occupant classification metric and the occupant's acceleration. The series of equations are solved for the two unknown values, and the occupant classification metric and the occupant acceleration are output from the occupant classification system. In some embodiments, such a calculation is performed for the acceleration of the occupant in both the x-direction and the y-direction, and a resultant acceleration vector for the occupant is calculated.

In some embodiments of the invention, the signals and information from the vehicle sensors, the vehicle safety module 205, and the occupant classification system are sent to the vehicle data recorder 210 over the CAN bus. For example, collision information, sensor offset information, airbag force and timing information, and occupant classification information is stored in an internal memory of the vehicle data recorder 210 for later analysis by, for example, an insurance company to assist in determining which driver may be at fault in a collision, and/or if a seat or force sensor is defective.

The force sensors described above with respect to occupant classification are configured such that when their measurement axis is aligned with gravity (e.g., is perpendicular to the ground), the force sensors generate an output which includes two components. The total output of the force sensor is given as $$m \cdot g + F(a) \qquad \text{EQN. 4}$$

where m*g is a weight and F(a) is an inertial force due to the acceleration of the platform to which the seat is attached. The occupant classification system described above is described with respect to the F(a) component. For example, the occupant classification system requires, in some embodiments, a subtraction of the weight component m*g to obtain the F(a) component. As such, a seat with integrated force sensors forms a large accelerometer in which inertial properties are defined by the seat and occupant centers of mass. Using the information from the force sensors, the following can be determined: 1) if the mass configuration is known, then the measured dynamic forces can be used to infer accelerations (i.e., vehicle state estimation); 2) if the accelerations are known, then the measured dynamic forces can be used to infer mass configuration (i.e., occupant classification); and 3) if both the mass configuration and the accelerations are known, the measured dynamic forces can be used to infer internal dynamics of the seat and/or the occupant which can then be used for system diagnostics and classification.

The capabilities and limitations of such a system are based on the number, location, and properties of the force sensors, as well as the design of the seat.

Thus, the invention provides, among other things, a system for classifying a vehicle occupant and controlling the operation of at least one vehicle safety system in response to the occupant classification. Various features and advantages of the invention are set forth in the following claims.

What is claimed is:

1. A method of classifying a vehicle occupant and controlling a system based on the classification, the method comprising:
receiving an acceleration value of the vehicle;
determining a change in the acceleration value;
receiving an output signal from at least one force sensor;
determining a change in the output signal from the at least one force sensor;
indirectly calculating a product of a mass of a control volume and a height of a center of gravity of the control volume based on the change in the output signal from the at least one force sensor and the change in the acceleration value, the control volume including the seat and the vehicle occupant; and
classifying the vehicle occupant based on the product.

2. The method of claim 1, further comprising controlling a vehicle safety system based on the classification of the vehicle occupant.

3. The method of claim 2, wherein the vehicle safety system is an airbag deployment system.

4. The method of claim 1, further comprising determining if a seat is occupied.

5. The method of claim 4, further comprising determining a seat offset value when the seat is unoccupied.

6. The method of claim 5, further comprising compensating at least one of the output signal from the at least one force sensor and the product based on the seat offset value.

* * * * *